(12) United States Patent
Kadota

(10) Patent No.: US 6,535,205 B2
(45) Date of Patent: Mar. 18, 2003

(54) COORDINATE DATA INPUT APPARATUS, COORDINATE DATA INPUT METHOD, AND STORAGE MEDIUM STORING COORDINATE INFORMATION INPUT PROGRAM

(75) Inventor: Shigehiro Kadota, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/948,661

(22) Filed: Sep. 10, 2001

(65) Prior Publication Data

US 2002/0059478 A1 May 16, 2002

(30) Foreign Application Priority Data

Sep. 12, 2000 (JP) ........................................ 2000-277349

(51) Int. Cl.$^7$ ................................................ G09G 5/00
(52) U.S. Cl. ...................... 345/173; 345/156; 345/174; 345/175; 345/179; 345/18.01; 345/18.02; 341/5; 178/18.01
(58) Field of Search ..................... 178/18.01; 345/173, 345/179, 156, 174, 175, 176, 18.01, 18.02; 341/5, 102, 103

(56) References Cited

U.S. PATENT DOCUMENTS

| 5,153,829 A | 10/1992 | Furuya et al. ............... 364/419 |
| 5,587,559 A | * 12/1996 | Fleck et al. ............... 178/18.01 |
| 5,614,926 A | * 3/1997 | Shigematsu et al. ..... 178/18.01 |
| 5,861,874 A | * 1/1999 | Joto ........................ 178/18.01 |
| 5,877,750 A | * 3/1999 | Hanson ................... 178/18.01 |
| 6,049,329 A | * 4/2000 | Zetts et al. ............... 178/18.01 |

FOREIGN PATENT DOCUMENTS

| JP | 6-028095 | 2/1994 |
| JP | 6-059813 | 3/1994 |
| JP | 2957368 | 7/1999 |

* cited by examiner

Primary Examiner—Michael Tokar
Assistant Examiner—Linh Van Nguyen
(74) Attorney, Agent, or Firm—Fitzpatrick, Cella, Harper & Scinto

(57) ABSTRACT

According to the present invention, a process for coordinate data entered by a currently used coordinate input device is automatically performed first, without a special mode setting operation being required.

First, a mouse driver is initialized, and then, a check is performed to determine whether a button on a digitizer is depressed. When the button on the digitizer is depressed, a corresponding process is performed, and the mouse driver is returned to the initial state after a predetermined time has elapsed. When a button on a mouse is depressed, a corresponding process is performed, and the mouse driver is returned to the initial state after a predetermined time has elapsed.

25 Claims, 6 Drawing Sheets

COORDINATE DATA INPUT APPARATUS, COORDINATE DATA INPUT METHOD, AND STORAGE MEDIUM STORING COORDINATE INFORMATION INPUT PROGRAM

BACKGROUND OF THE INVENTION

1. Field of the Invention

The present invention relates to a coordinate data input apparatus, a coordinate data input method, and a storage medium on which a coordinate data input program is stored. More specifically, the present invention relates to a coordinate data input apparatus for selecting one of coordinate data sets that are entered by multiple coordinate input devices, such as both a mouse and a digitizer, and a coordinate data input method and a storage medium on which a coordinate data input program is stored.

2. Related Background Art

Conventionally, a computer system employs a digitizer such as a tablet, a mouse, a joy stick or a trackball, as a coordinate input device that is used to enter a process (menu) or a corresponding instruction.

Since a mouse, which is the most popular coordinate input device, is small and easy to handle, it is appropriate for a pointer that interacts with the movement of a mouse to be displayed on the screen of a computer and for an arbitrary location on the screen to be designated or for an item on a menu displayed on the screen to be selected by the depression of a button. On the other hand, the mouse is not appropriate for a very accurate and detailed input operation, as when drawing on the display screen is performed.

While taking into account the relative advantages of a mouse and a tablet, arrangements for the selective use of the two input devices have been provided. One sample proposal could be, for example, a "coordinate input device switching device" disclosed in Japanese Patent No. 2,957,368.

According to the coordinate input device switching device in Japanese Patent No. 2,957,368, when multiple coordinate input devices are connected to a computer that is in use, an accurate and easy input operation can be performed, while the possibility is avoided that a slight movement of a coordinate device, due to vibration, will cause that device to be selected. Further, the "code input device switching device" is so designed that not only is a selection not made merely by a slight movement of the coordinate input device, but also so that a desired coordinate input device can be selected by an instruction transmitted by the coordinate input device, and a more accurate and easier input operation can be performed.

The conventional "coordinate input device switching device" has various merits; however, since it is assumed that one user will continuously manipulate either a mouse or a digitizer, such as a tablet, if a mouse and a digitizer (tablet) are separately employed by two users, a conflict occurs in the use of the pointing devices, i.e., a problem occurs due to the simultaneous use.

For example, assume that a first user manipulates a mouse and a second user employs a digitizer (tablet) to write a character. In this case, while the first user is manipulating the mouse, only after the second user lifts the tip of the digitizer pen from the tablet is the mouse entry regarded as valid.

This problem can be avoided by setting a so-called tablet preference mode; however, the operating mode must be changed during an operation, and the process of the operation becomes complicated.

Recently, the use of large-screen display devices for television conference systems has spread, and a mouse or a digitizer has been employed as coordinate input devices for entering instructions corresponding to a process. Especially, as is described above, since a digitizer can be handled in the same manner as common writing equipment, this pointing device is appropriate for a television conference system that employs handwritten drawings.

When a large-screen display device equipped with a digitizer is used like a white board, multiple pens for the digitizer may be employed. Well known arrangements for using multiple pens for a digitizer are an "electronic data drawing device" disclosed in Japanese Patent Application Laid-open No. 6-59813 and a "coordinate input control device" disclosed in Japanese Patent Application Laid-open No. 6-28095. "Electronic data drawing device" of Japanese Patent Application Laid-open No. 6-59813 discloses that multiple conference participants employ multiple digital pens at the same time on one screen and the direction of the window is changed so that each participant can easily see it. "Coordinate input control device" of Japanese Patent Application Laid-open No. 6-28095 discloses that a validation of the cursor input is smoothly transferred when multiple users enter coordinates at the same time using multiple digital pens.

The two conventional examples are provided on the assumption that two users employ digitizer pens at the same time. In a emulation system for entering coordinate data of a digitizer by utilizing a mouse has the same problem. That is, when one user operates a mouse while the other user detaches the pen from the digitizer per each stroke of writing, the input by the mouse become valid.

Further, according to the "electronic data drawing device" disclosed in Japanese Patent Application Laid-open No. 6-59813, a new screen drawing device for the use of multiple pens at the same time is required, and the conventional system can not be employed directly. In "coordinate input control device" of Japanese Patent Application Laid-open No. 6-28095 a conventional mouse driver can be utilized. However, in case that the input mode of the digitizer is changed when one user employs a pen while another user is writing a character, there is a problem in which the position of the cursor.

To resolve this problem, it is one objective of the present invention to provide a coordinate data input apparatus, a coordinate data input method and a storage medium storing a coordinate data input program automatically giving priority of an input processing of coordinate information data by a currently valid coordinate input apparatus without requiring a special mode setting operation.

SUMMARY OF THE INVENTION

To achieve the above objective, according to a first aspect of the present invention, a coordinate data input apparatus comprises:
- a connection means connecting multiple coordinate input means;
- a driver, for receiving coordinate information from the multiple coordinate input means via the connection means; and
- a processing means, when a selected coordinate input means is operated, for validating only coordinate information supplied by the selected coordinate input means during a predetermined time.

According to a second aspect of the invention, a coordinate data input method by means of utilizing multiple coordinate input means, comprises the steps of:

validating, when specific coordinate input means of the multiple coordinate input means is operated to supply coordinate data, only coordinate information supplied by the coordinate input means under operation during a predetermined time.

According to a third aspect of the invention, a storage medium is provided on which a computer-readable program executing a method by means of multiple coordinate input means, comprising a validating step of validating, when a coordinate input means of the multiple coordinate input means is operated to supply coordinate information, only coordinate information supplied by the coordinate input means under operation until a predetermined time.

According to a fourth aspect of the invention, a coordinate data input apparatus comprises:

a coordinate input means including multiple input pens;

firmware for receiving coordinate information input by the coordinate input means; and a processing means for permitting the firmware, when an input pen is operated, to output only coordinate data designated by the input pen under operation.

According to a fifth aspect of the invention, a coordinate data input method comprises the step of:

permitting firmware, when an input pen of multiple input pens is operated, to output only coordinate information designated by the input pen under operation during a predetermined time.

According to a sixth aspect of the invention, a storage medium is provided on which a computer-readable program executing a method by means of multiple input pens is stored, the method comprising the step of:

permitting firmware, when an input pen of the multiple input pens is operated, to output only coordinate information designated by the input pen under operation during a predetermined time.

Other features and advantages of the present invention will become apparent during the following description given in conjunction with the accompanying drawings, in which like reference numbers are used to designate the same or similar parts in the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

In accordance with the accompanying drawings, preferred embodiments of the present invention will now be described in detail.

(First Embodiment)

Figure 1:
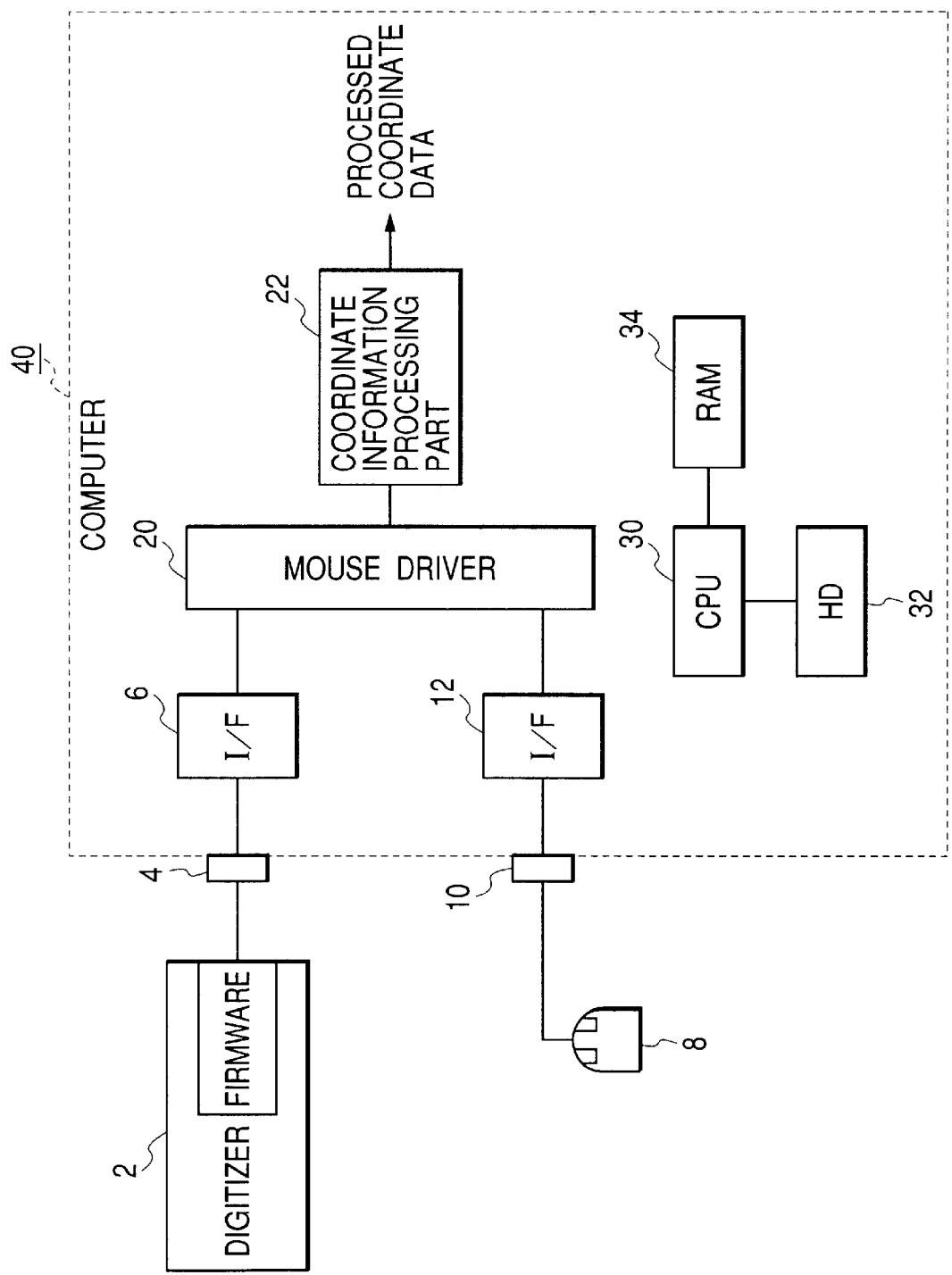
FIG. 1 is a diagram showing the general configuration of a coordinate data input apparatus according to the present invention.

FIG. 1 is a diagram showing the general configuration of a coordinate data input apparatus according to the present invention. In FIG. 1, a digitizer 2 is a pointing device. The digitizer 2 in a first embodiment cannot only be a coordinate input device including a tablet and a pen, but can also be a pen-type coordinate input device used for a large-screen display, such as an electronic blackboard. The digitizer 2 includes firmware for converting coordinate data detected by the digitizer 2 into a signal having the same form as a mouse signal, and for outputting the signal to a computer 40. Numeral 4 denotes an RS-232C connector and numeral 6 denotes a digitizer interface.

A mouse 8 is another pointing device, and a mouse port 10 and a mouse interface 12 are provided for the mouse 8.

A mouse driver 20 can be designed either as hardware or as software to be implemented when a CPU 30 executes an application program. The importance in the first embodiment of the mouse driver 20 is that, as will be explained later, it performs a control process for the coordinate data that is output by the digitizer 2 and the mouse 8.

A coordinate data processor (information processing part) 22 receives coordinate data from the mouse driver 20 (i.e., coordinate data output by either the digitizer 2 or the mouse 8), and performs a predetermined process required for the succeeding stage (not shown).

A CPU 30 exercises control of other components and performs calculations, and a hard disk 32 is used to store an OS and other application programs. A RAM 34 is also provided.

Numeral 40 denotes a computer comprising each of the above described components excluding the digitizer 2 and the mouse 8.

Figure 2:
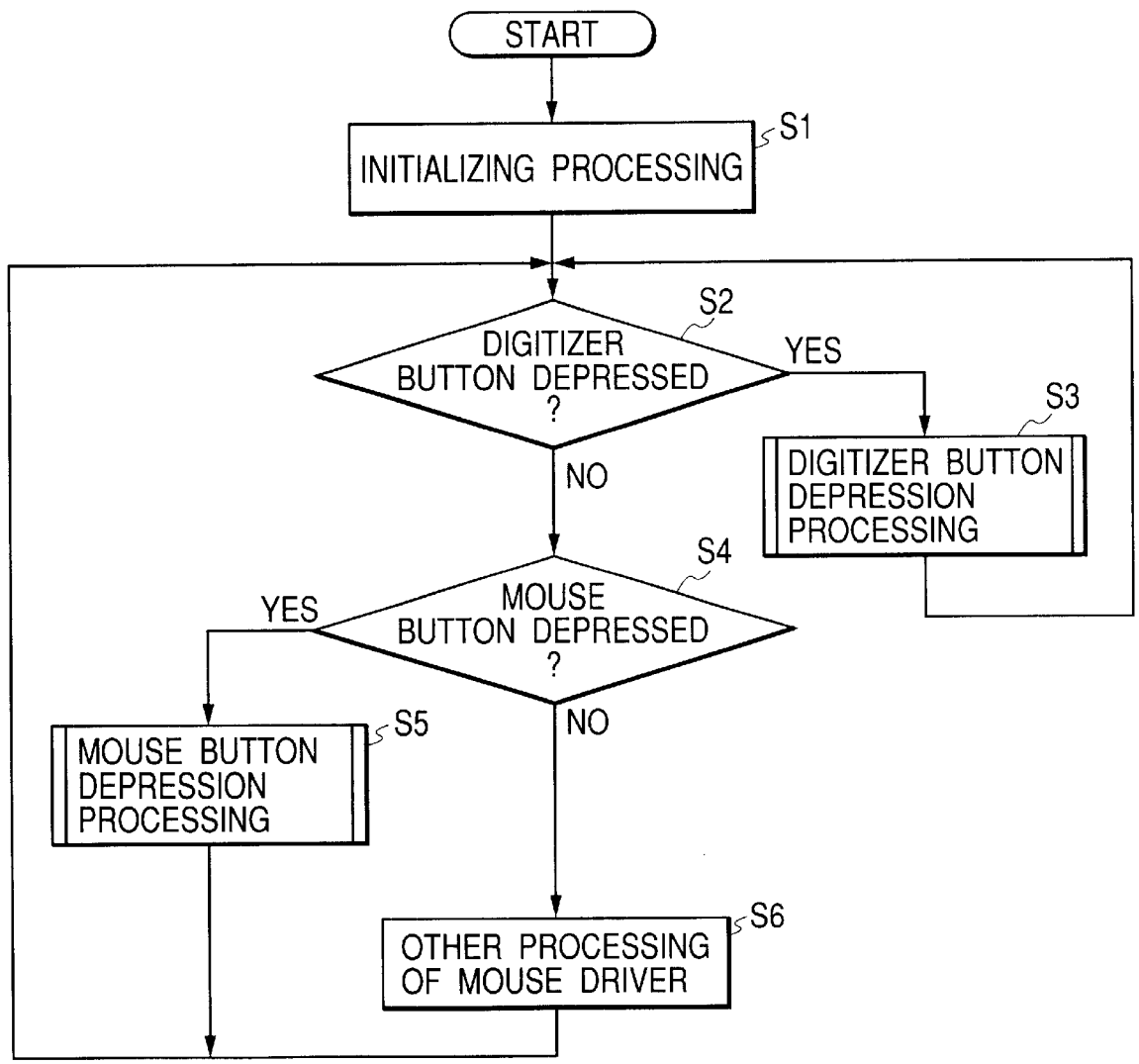
FIG. 2 is a flowchart showing the main processing routine for a mouse driver.

FIG. 2 is a flowchart showing the processing performed by the device driver, i.e., the mouse driver 20 of the first embodiment.

First, at step S1 the mouse driver 20 is initialized in the same manner as is conventionally performed.

At step S2, a check is performed to determine whether a button (not shown) is depressed on the digitizer 2, which is a coordinate input device. When the button on the digitizer 2 is depressed, at step S3 a process (a sub-routine) is performed for a case wherein the button of the digitizer 2 is depressed. Program control thereafter returns to step S2.

At step S4 a check is performed to determine whether a button on the mouse 8, which is a coordinate input device, is depressed. When the button on the mouse 8 is depressed, at step S5 a process is performed for a case wherein the button on the mouse 8 is depressed. Program control thereafter returns to step S2.

At step S6, whereat a normal mouse driver process is performed, a mouse cursor is shifted when the button is not depressed. Since the processes performed by the mouse driver 20 are event driven, and are performed when the mouse 8 is moved or a button is depressed, after the mouse driver process at step S6 is performed, the program control returns to step S2 for the determination process performed to determine whether the button on the digitizer 2 is depressed.

The digitizer 2 is connected to the computer 40 via the RS-232C connector 4, while the mouse 8 is connected to the computer 40 via the mouse port 10. Because two different hardware interfaces are used, the mouse driver 20 is set up to receive coordinate data and button data from both interfaces at the same time.

Figure 3:
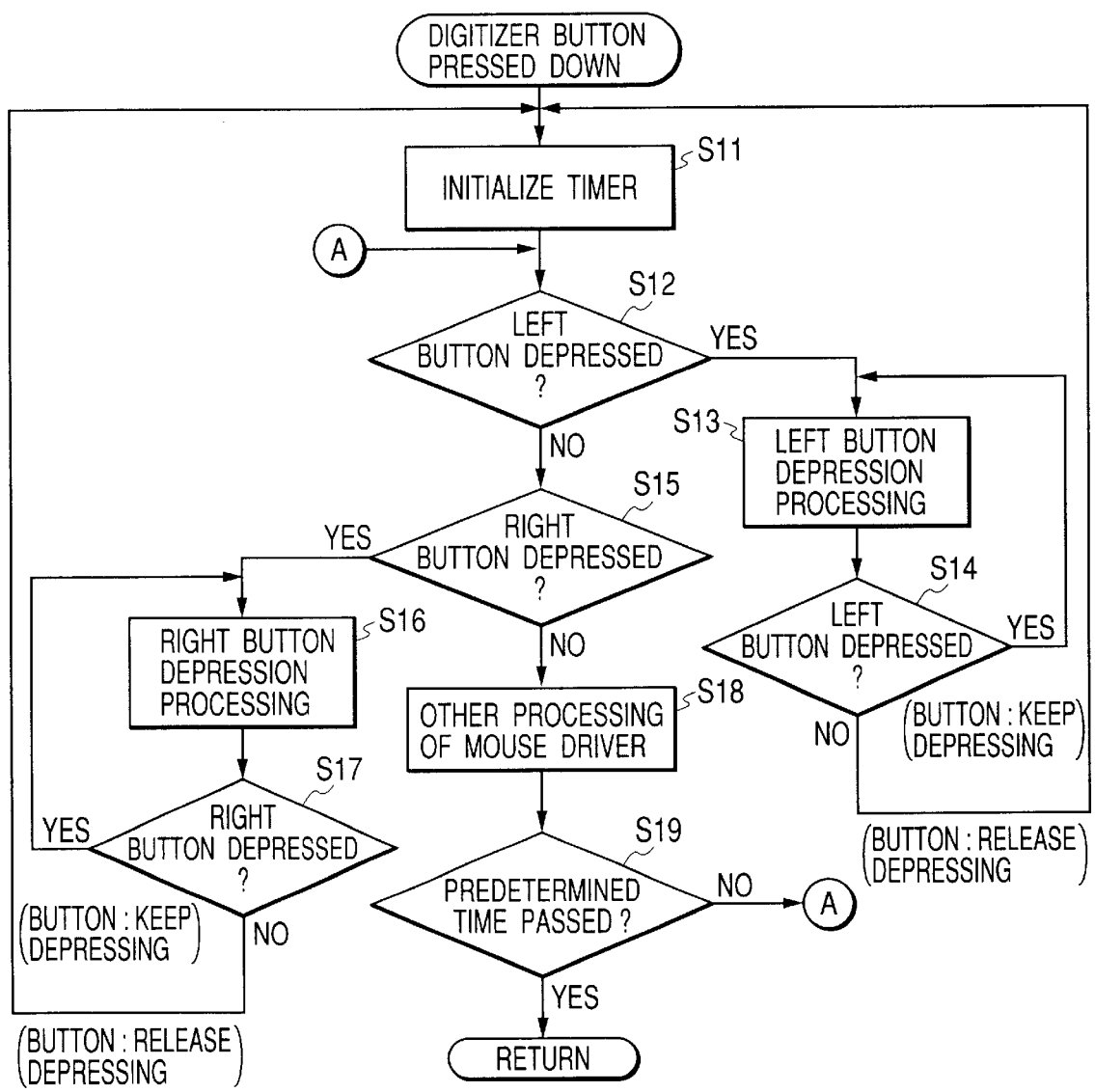
FIG. 3 is a flowchart showing the sub-routine performed upon the depression of a button on a digitizer.

FIG. 3 is a flowchart showing the processing performed when a button on the digitizer 2 is depressed.

Upon the depression of the button on the digitizer 2, at step S11 a timer is set to measure the elapsed time until the button is released. This timer is a count-down timer; the value set for the timer is decremented by a hardware timer interrupt that occurs at predetermined intervals. Therefore, when the timer value has reached 0, it is determined that the time designated for the timer has expired. The value set for the timer depends on the hardware interrupt interval, and the length of the period until the time-out can be arbitrarily set by a user.

At step S12, a check is performed to determine whether a depressed button is the left button. When the left button is depressed, at step S13 the same process is performed as is conventionally performed upon the depression of the left button of the mouse driver. At step S14, a check is continuously performed to determine whether the left button is depressed. When the left button is depressed, program control returns to step S13, whereat the same mouse driver process is performed as is conventionally performed upon the depression of the left button. When it is ascertained at step S14 that the left button is not depressed, program control returns to step S11 and the timer is set.

When it is ascertained at step S12 that the depressed button is not the left button, at step S15 a check is performed to determine whether the depressed button is the right button. When the right button is depressed, at step S16 the same mouse driver process is performed as is conventionally performed upon the depression of the right button. Then, at step S17 a check is sequentially performed to determine whether the right button is depressed. When the right button is depressed, program control returns to step S16, and the same mouse driver process is performed as is conventionally performed upon depression of the right button.

When it is ascertained at step S17 that the right button is not depressed, program control returns to step S11 and the timer is set.

When it is ascertained at step S15 that the depressed button is not the right button, it is assumed that no button on the digitizer 2 is depressed, and at step S18 the same mouse driver process is performed as is conventionally performed when no button is depressed.

At step S19, a check is performed to determine whether a predetermined time set for the timer at step S11 has expired. When the predetermined time has not expired, program control returns to step S12 for the determination process performed to determine whether the left button is depressed. When the predetermined time has expired, the process related to the depression of the button on the digitizer 12 is terminated. Program control thereafter returns to step S2 in FIG. 2 for the determination process performed to determine whether the button on the digitizer 2 is depressed.

At this time, when the button on the digitizer 2 is not depressed, and the button on the mouse 8 is depressed, the process related to the depression of the button on the mouse 8 (see step S5 in FIG. 4) is performed. However, when the button on the mouse 8 is not depressed, the next coordinate input device on which a button is depressed is employed in preference to others.

Figure 4:
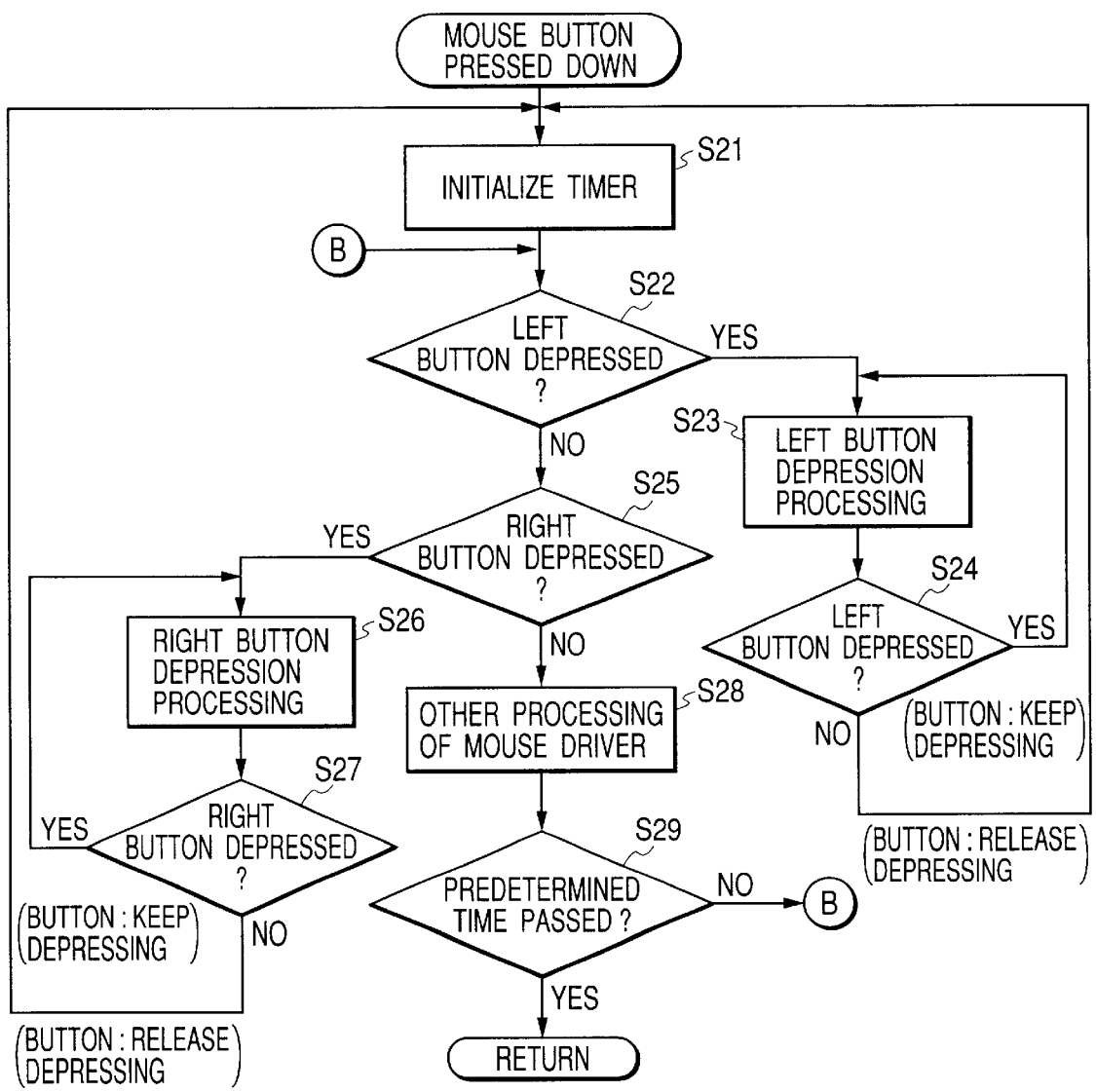
FIG. 4 is a flowchart showing the sub-routine performed upon the depression of a button on a mouse.

FIG. 4 is a flowchart showing the process performed when the button on the mouse 8 is depressed. Upon the depression of the button on the mouse 8, at step S21, the timer is set to measure the elapsed time until the button is released. This timer is a count-down timer, and the value held by the timer is decremented by a hardware timer interrupt that occurs at predetermined intervals. Therefore, when the timer value is 0, it is determined that the time designated for the timer has expired. The value set to the timer depends on the hardware interrupt interval, and the length of the period before a time-out can be arbitrarily set by a user.

At step S22, a check is performed to determine whether the depressed button is the left button. When the left button is depressed, at step S23 the conventional mouse driver process is performed that is related to the depression of the left button on the mouse. Then, at step S24 a check is sequentially performed to determine whether the left button is depressed. When the left button is depressed, program control returns to step S23, and the conventional mouse driver process related to the depression of the left button on the mouse is performed.

When it is ascertained at step S24 that the depressed button is not the left button, at step S25 a check is performed to determine whether the depressed button is the right button. When the right button is depressed, at step S26 the same mouse driver process is performed as is conventionally performed upon the depression of the right button. Then, at step S27 a check is again performed to determine whether the right button is depressed. When the right button is depressed, program control returns to step S26, and the same mouse driver process is performed as is conventionally performed upon the depression of the right button.

When it is ascertained at step S27 that the right button is not depressed, program control returns to step S21 and the timer is set.

When at step S25 the depressed button is not the right button, it is assumed that no button on the digitizer 2 is depressed, and at step S28 the same normal process is performed as is performed conventionally when the button on the mouse driver is not depressed.

At step S29, a check is performed to determine whether a predetermined time set for the timer at step S21 has expired. When the predetermined time has not elapsed, program control returns to step S22 for the determination process performed to determine whether the left button is depressed. When the predetermined time has expired, the process related to the depression of the button on the mouse 8 is terminated, and program control returns to step S2 in FIG. 2 for the determination process performed to determine whether the button on the digitizer 2 is depressed.

When at this time the button on the digitizer 2 is depressed, the process related to the depression of the button on the digitizer 2 is continued. When the button on the digitizer 2 is not depressed, the next coordinate input device on which a button is depressed is employed in preference to others.

In the first embodiment, the RS-232C connector 4 is employed for the connection of the digitizer 2; however, a USB port, parallel communication or radio communication may also be employed. Further, although the mouse port 10 is employed for the connection of the mouse 8, the RS-232C connector 4, the USB port or radio communication may be employed.

In the first embodiment, a two-button mouse 8 is employed; however, either a three-button mouse or a single-button mouse may also be employed. In addition, only the digitizer 2 and the mouse 8 are employed; however, another coordinate input device can also be employed.

The first embodiment can be applied for a mouse driver stored in a ROM, or can be applied when a mouse driver is supplied to a system or an apparatus. In this case, the effects provided by the invention can be obtained for the system or the apparatus by reading from a storage medium a program that is represented by the software that carries out the invention.

In the first embodiment, the storage medium can be a memory, such as a ROM or a RAM, a hard disk, a floppy disk, an optical disk, a magneto-optical disk, a CD-ROM, a CD-R, a DVD, a magnetic tape or a nonvolatile memory card.

As is described above, according to the first embodiment, for a conference during which a digital board and pen, and a mouse are used a user does not interrupt an entry by writing with on the digital board with the pen, even when another user is manipulating a mouse. Further, a preferred coordinate input device can be selected without a mode that is consonant with the coordinate input device having to be set.

(Second Embodiment)

The configuration in FIG. 1 is also employed for a second embodiment that will now be described in detail. It should be noted, however, that in the second embodiment a pen type coordinate input device, which is used for a large-screen display, such as a digital board, is employed.

Figure 5:
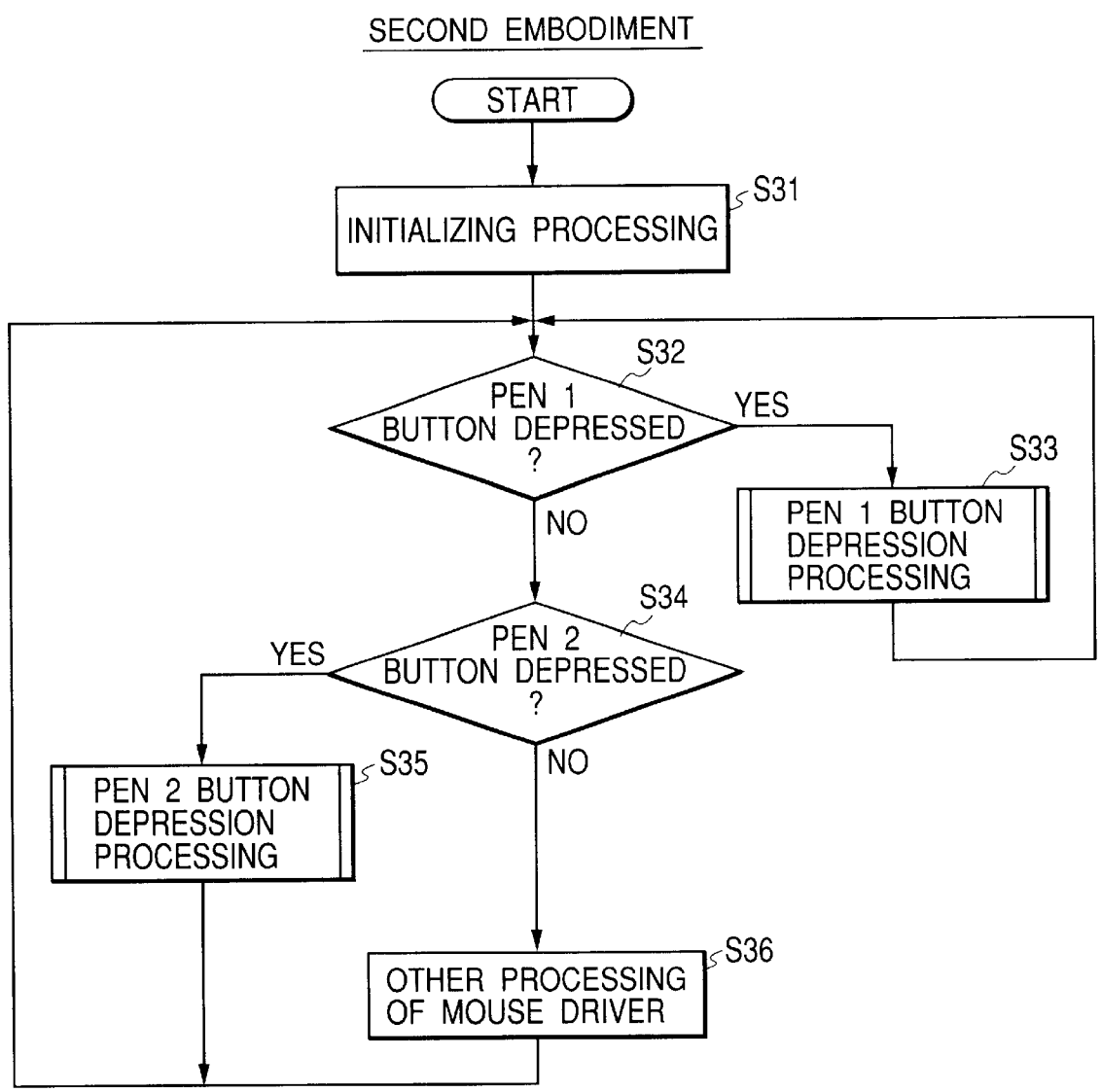
FIG. 5 is a flowchart showing the main routine for the internal process for the digitizer.

FIG. 5 is a flowchart showing the processing performed by the firmware for a coordinate input device (digitizer) according to the second embodiment.

In the second embodiment, mouse emulation is used and coordinate data and button data are transmitted to a computer 40. Further, in the second embodiment, a digitizer 2 includes two pens, a pen 1 and a pen 2.

In FIG. 5, at step S31 the initialization of the coordinate input device is performed when the power is turned on or a reset button is depressed.

At step S32, a check is performed to determine whether a button for the pen 1 is depressed. When the button of the pen 1 has been depressed, at step S33 a process is performed that is associated with the depression of the button for the pen 1. Program control then returns to step S32. At step S34, a check is performed to determine whether a button for the pen 2, which is another coordinate input device, is depressed. When the button of the pen 2 is depressed, at step S35 a process is performed that is associated with the depression of the button for the pen 2, and thereafter, program control returns to step S32.

At step S36 a normal digitizer 2 firmware process is performed. When a button is not depressed, coordinate data is transmitted to the computer 40. Since the digitizer 2 processes the coordinate data in accordance with the movement of a pen, following step S36 for the coordinate data process, program control returns to step S32 for the determination process performed to determine whether button for the pen 1 is depressed.

Different timings or frequencies are provided for the pen 1 and the pen 2 of the digitizer 2, so that the individual pens can be identified. Thus, the firmware for the digitizer 2 can at the same time receive coordinate data and button data from the two pens.

Figure 6:
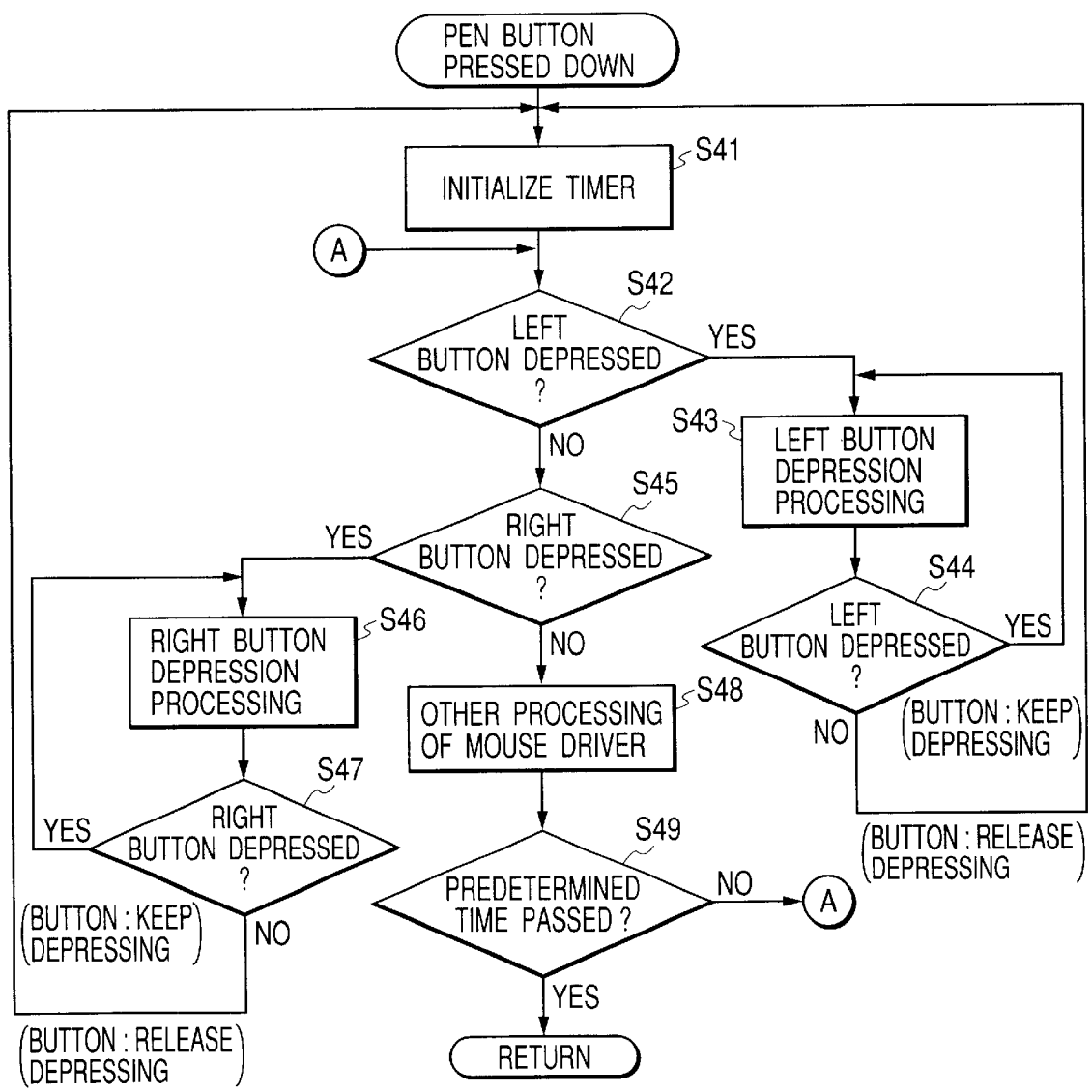
FIG. 6 is a flowchart showing the sub-routine executed upon the depression of a button on a pen attached to the digitizer.

FIG. 6 is a flowchart showing the process performed when a button for one of the pens of the digitizer 2 is depressed. Since the same process is performed for the pens 1 and 2, for convenience sake, only the process for the pen 1 will be described.

At step S41, a timer is set to measure a period until a button is released. This timer is a count-down timer, and the value set for the timer is decremented by a hardware timer interrupt that occurs at predetermined intervals. Therefore, when the timer value reaches 0, it is determined that the predetermined time set for the timer has expired. The value set for the timer depends on the hardware interrupt interval, and the length of the period before a time-out can be arbitrarily set by a user.

At step S42, a check is performed to determine whether the depressed button is the left button. When the left button is depressed, at step S43 a conventional process related to the depression of the left button of a mouse is performed. Then, at step S44, a check is sequentially performed to determine whether the left button is depressed. When the left button is depressed, program control returns to step S43, and the conventional process related to the depression of the left button of a mouse is again performed. When it is ascertained at step S44 that the left button is not depressed, program control returns to step S41 and the timer is set.

When it is ascertained at step S42 that the depressed button is not the left button, at step S45 a check is performed to determine whether the depressed button is the right button. When the right button is depressed, at step S46 the conventional process related to the depression of the right button of a mouse is performed. Then, at step S47, a check is sequentially performed to determine whether the right button is depressed. When the right button is depressed, program control returns to step S47. But when is ascertained at step S47 that the right button is not depressed, program control returns to step S41 and the timer is set.

When at step S45 it is determined that the depressed button is not the right button, it is assumed that no button for the pen is depressed, and at step S48, a normal process is performed that is conventionally performed when no mouse button is depressed.

At step S49, a check is performed to determine whether the predetermined time set for the timer at step S41 has expired or elapsed. When the time has not expired, program control returns to step S42 for the determination process performed to determine whether the left button is depressed. When the predetermined time has expired, the process performed for the depression of the button for the pen is terminated. Program control thereafter returns to step S32 in FIG. 5 for the determination process performed to determine whether the button for the pen 1 is depressed.

When it is determined that a button for the pen 2 is depressed because the buttons for the pen 1 have not been depressed, the process related to the button for the pen 2 is continuously performed. When a button for the pen 2 is not depressed, the next pen on which a button is depressed is employed in preference to others.

The process for the pen 2 is performed in the same manner as in FIG. 6.

In the second embodiment, pens for a two-button digitizer have been employed; however, either a three-button digitizer or a single-button digitizer may be employed. Further, although only two pens have been employed, any number of pens may be employed.

In the second embodiment, the firmware for the digitizer 2 has been stored in the ROM. However, the firmware can be applied by supplying the mouse driver a system or an apparatus. In this case, the effects of the invention can be obtained for the system or the apparatus by reading from a storage medium a program that is represented by software that carries out the second embodiment.

According to the second embodiment, during a conference for which a digital board with two pens is used, a user does not interrupt an entry by writing with a pen on the digital board, even when the other user is manipulating a mouse. Further, a pen in use can be selected without having to set a mode that is consonant with the pen.

As is described above, according to the invention, it is possible, without having to set a special mode, or to add new hardware or to alter an OS or an application program, to implement a coordinate data input apparatus that automatically processes coordinates entered by a currently employed coordinate input device and to provide a coordinate data input method therefor, and to provide a storage medium on which the coordinate data input program is stored.

What is claimed is:

1. A coordinate data input apparatus comprising:
a connection means connecting multiple coordinate input means;
driver for receiving coordinate information from said multiple coordinate input means via said connection means; and
processing means for validating, when a selected coordinate input means is operated, only coordinate information supplied by the selected coordinate input means, during a predetermined time which is an unoperated state, the predetermined time being counted after selection of the selected coordinate input means.

2. A coordinate data input apparatus according to claim 1, wherein each of said multiple coordinate input means has operating buttons, and wherein, in response to a depression of one of said operating buttons, said processing means validates only coordinate information input by a coordinate input means having said depressed operating button during the predetermined time.

3. A coordinate data input apparatus according to claim 1, wherein each of said coordinate input means comprises a digitizer or a mouse.

4. A coordinate data input apparatus according to claim 1, wherein at least one of said multiple coordinate input means includes multiple input pens, and wherein, when an input pen is operated, said processing means validates only coordinate information received from said input pen under operation during the predetermined time.

5. A coordinate data input apparatus according to claim 4, wherein said multiple input pens output individual forms of coordinate data.

6. A coordinate data input apparatus according to claim 4, wherein said multiple input pens each include multiple operating buttons the depression of each of which is identified by a button depression signal having an individual form when the operating button is depressed.

7. A coordinate data input method by means of utilizing multiple coordinate input means, comprising:
a validating step of validating, when a coordinate input means of the multiple coordinate input means is operated to supply coordinate information, only coordinate information supplied by the operated coordinate input means during a predetermined time which is an unoperable state, the predetermined time being counted after selection of the coordinate input means.

8. A coordinate data input method according to claim 7, wherein each of the multiple coordinate input means has operating buttons, and wherein, in response to a depression of one of the operating buttons, in said validating step, only coordinate information input by a coordinate input means having the depressed operating button is validated during the predetermined time.

9. A coordinate data input method according to claim 7, wherein each of the coordinate input means comprises a digitizer or a mouse.

10. A coordinate data input method according to claim 7, wherein at least one of the multiple coordinate input means includes multiple input pens, and wherein, when an input pen is operated, in said validating step, only coordinate data received from the input pen under operation is validated during the predetermined time.

11. A coordinate data input method according to claim 10, wherein the multiple input pens output individual forms of coordinate data.

12. A coordinate data input method according to claim 10, wherein the multiple input pens each include multiple operating buttons the depression of each of which is identified by a button depression signal having an individual form when the operating button is depressed.

13. A storage medium storing a computer-readable program executing an input method by means of multiple coordinate input means, the method comprising:
a validating step of validating, when a coordinate input means of the multiple coordinate input means is operated to supply coordinate information, only coordinate information supplied by the operated coordinate input means during a predetermined time which is an unoperable state, the predetermined time being counted after selection of the coordinate input means.

14. A storage medium according to claim 13, wherein each of the multiple coordinate input means has operating buttons, and wherein, in response to a depression of one of the operating buttons, in said validating step, only coordinate information input by a coordinate input means having the depressed one of the operating buttons is validated during the predetermined time.

15. A storage medium according to claim 13, wherein each of the coordinate input means comprises a digitizer or a mouse.

16. A storage medium according to claim 13, wherein at least one of the multiple coordinate input means includes multiple input pens, and wherein, when an input pen is operated, in said validating step, only coordinate information received from the input pen under operation is validated during the predetermined time has elapsed.

17. A storage medium according to claim 16, wherein the multiple input pens output individual forms of coordinate data.

18. A storage medium according to claim 16, wherein the multiple input pens each include multiple operating buttons the depression of each of which is identified by a button depression signal having an individual form when the operating button is depressed.

19. A coordinate data input apparatus comprising:
coordinate input means including multiple input pens;
firmware for receiving coordinate information input by said coordinate input means; and
processing means for permitting said firmware, when one of said multiple input pens is operated, to output only coordinate information designated by the operated input pen during a predetermined time which is an unoperable state, the predetermined time being counted after selection of the operated input pen.

20. A coordinate data input method by means of multiple input pens, comprising the steps of:
permitting firmware, when one of the multiple input pens is operated, to output only coordinate information designated by the operated input pen during a predetermined time which is an unoperable state, the predetermined time being counted after selection of the operated input pen.

21. A storage medium storing a computer-readable program executing an input method by means of multiple input pens, the method comprising the step of:
permitting firmware, when one of the multiple input pens is operated, to output only coordinate information designated by the operated input pen until a predetermined time which is an unoperable state, has elapsed, the predetermined time being counted after selection of the operated input pen.

22. A storage medium according to claim 13, wherein the storage medium comprises a floppy disk, a hard disk, a magneto-optical disk, an optical disk, a CD-ROM, a CD-R, a magnetic tape, a nonvolatile memory card or a ROM, on each of which is stored a program read by a server computer and a client computer.

23. A storage medium according to claim 21, wherein the storage medium comprises a floppy disk, a hard disk, a magneto-optical disk, an optical disk, a CD-ROM, a CD-R, a magnetic tape, a nonvolatile memory card or a ROM, on each of which is stored a program read by a server computer and a client computer.

24. A storage medium according to claim 13, wherein the storage medium is detachable from to a server computer and a client computer.

25. A storage medium according to claim 21, wherein the storage medium is detachable from to a server computer and a client computer.

* * * * *

UNITED STATES PATENT AND TRADEMARK OFFICE
CERTIFICATE OF CORRECTION

PATENT NO. : 6,535,205 B2  Page 1 of 1
DATED : March 18, 2003
INVENTOR(S) : Shigehiro Kadota It is certified that error appears in the above-identified patent and that said Letters Patent is hereby corrected as shown below:

Column 10,
Line 30, "time has elapsed." should read -- time. --.

Column 12,
Lines 4 and 7, "from to a" should read -- from a --.

Signed and Sealed this

Twenty-seventh Day of January, 2004

JON W. DUDAS
*Acting Director of the United States Patent and Trademark Office*